(12) United States Patent
Zhao

(10) Patent No.: US 10,089,972 B2
(45) Date of Patent: Oct. 2, 2018

(54) NOISE REDUCTION METHOD AND APPARATUS, AND MOBILE TERMINAL

(71) Applicant: HUAWEI TECHNOLOGIES CO., LTD., Shenzhen (CN)

(72) Inventor: Wenlong Zhao, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/321,210

(22) PCT Filed: Jun. 26, 2014

(86) PCT No.: PCT/CN2014/080885
§ 371 (c)(1),
(2) Date: Dec. 22, 2016

(87) PCT Pub. No.: WO2015/196434
PCT Pub. Date: Dec. 30, 2015

(65) Prior Publication Data
US 2017/0162183 A1    Jun. 8, 2017

(51) Int. Cl.
*G10K 11/16* (2006.01)
*G10K 11/178* (2006.01)
(Continued)

(52) U.S. Cl.
CPC ............ *G10K 11/178* (2013.01); *G06F 3/165* (2013.01); *G10K 11/1782* (2013.01); *H04R 3/02* (2013.01);
(Continued)

(58) Field of Classification Search
USPC .......... 381/13, 71.1, 71.2, 71.14, 71.6, 71.8, 381/73.1, 94.1
See application file for complete search history.

(56) References Cited

U.S. PATENT DOCUMENTS

2009/0287485 A1    11/2009    Glebe
2010/0172519 A1    7/2010    Kimura
(Continued)

FOREIGN PATENT DOCUMENTS

CN    101795143 A    8/2010
CN    102027536 A    4/2011
(Continued)

OTHER PUBLICATIONS

International Search Report dated Mar. 30, 2015 in PCT/CN2014/080885.

*Primary Examiner* — Yosef K Laekemariam
(74) *Attorney, Agent, or Firm* — Oblon, McClelland, Maier & Neustadt, L.L.P.

(57) ABSTRACT

Embodiments of the present disclosure provide a noise reduction method, the method includes: obtaining an acceleration signal of a mobile terminal when an audio output device is in a working state; determining, according to the acceleration signal, a vibration waveform of the mobile terminal when the mobile terminal vibrates; inverting the determined vibration waveform to obtain a noise reduction signal; and superimposing the noise reduction signal onto to-be-output audio of the audio output device. Therefore, noise generated by skeleton vibration is diminished or eliminated, so as to improve an effect of listening, by a person, to audio.

13 Claims, 5 Drawing Sheets

(51) Int. Cl.
  *G06F 3/16* (2006.01)
  *H04R 3/02* (2006.01)
(52) U.S. Cl.
  CPC . *G10K 2210/108* (2013.01); *G10K 2210/129* (2013.01); *G10K 2210/3044* (2013.01); *G10K 2210/3056* (2013.01); *G10K 2210/3226* (2013.01); *G10K 2210/501* (2013.01); *H04R 2499/11* (2013.01)

(56) References Cited

U.S. PATENT DOCUMENTS

| | | | |
|---|---|---|---|
| 2012/0289162 A1* | 11/2012 | Hosoi | H04R 25/606 |
| | | | 455/41.3 |
| 2013/0065648 A1* | 3/2013 | Kim | G06F 21/31 |
| | | | 455/566 |
| 2015/0054769 A1* | 2/2015 | Kamata | G06F 3/016 |
| | | | 345/173 |

FOREIGN PATENT DOCUMENTS

| | | |
|---|---|---|
| CN | 1023148871 A | 1/2012 |
| JP | 2007219262 A | 8/2007 |

* cited by examiner

NOISE REDUCTION METHOD AND APPARATUS, AND MOBILE TERMINAL

CROSS-REFERENCE TO RELATED APPLICATIONS

This application is a National Stage of International Application No. PCT/CN2014/080885, filed on Jun. 26, 2014, which is hereby incorporated by reference in its entirety.

TECHNICAL FIELD

The present disclosure relates to the field of mobile terminals, and in particular, to a noise reduction method and apparatus, and a mobile terminal.

BACKGROUND

Auditory sense is generated by collecting a sound to the external auditory canal through the external pinna, which causes vibration of the tympanic membrane and subsequently drives the malleus to move, is transmitted to the incus and the stapes, and is then transmitted to the auditory nerve. Sounds include a sound that people intend to hear and a sound that people do not intend to hear, that is, noise. The auditory sense formed from noise often bothers people. For example, when a person is listening to audio output by a machine, such as a mobile terminal, entrance of noise affects an effect of the audio to which the person is listening, irritates the person, and even affects health of the person.

In existing noise reduction methods, only noise transmitted in ambient space is taken into consideration, and noise transmitted in another manner is not taken into consideration. Therefore, effects of the existing noise reduction methods have some limitations and are insufficiently desirable.

SUMMARY

To improve a noise reduction effect, the present disclosure provides a noise reduction method and apparatus, and a mobile terminal. The technical solutions are as follows:

According to a first aspect, the present disclosure provides a mobile terminal, including a processor, an audio output device configured to output audio, and a sensor configured to collect an acceleration signal of the mobile terminal, where the mobile terminal further includes a noise reduction signal determining circuit and a coupling circuit, where: the noise reduction signal determining circuit is configured to, when the audio output device is in a working state, obtain the acceleration signal of the mobile terminal, determine, according to the acceleration signal, a vibration waveform of the mobile terminal when the mobile terminal vibrates, and further invert the determined vibration waveform to obtain a noise reduction signal having a waveform the same as the inverted vibration waveform, where the acceleration signal is collected by the sensor; and the coupling circuit is configured to superimpose the noise reduction signal onto to-be-output audio of the audio output device.

With reference to the first aspect, in a first implementation manner of the first aspect, the noise reduction signal determining circuit includes: a resistor R1, a resistor R2, a resistor R3, a resistor R4, a capacitor C1, a capacitor C2, a capacitor C3, an operational amplifier U1, and an operational amplifier U2, where: a first end of the resistor R1 receives the acceleration signal, a second end of the resistor R1 is electrically connected to an in-phase input end of the operational amplifier U1 and a first end of the capacitor C1 separately, and a second end of the capacitor C1 is grounded; a first end of the resistor R2 is grounded, a second end of the resistor R2 is electrically connected to a reverse-phase input end of the operational amplifier U1 and a first end of the capacitor C2 separately, and an output end of the operational amplifier U1 is electrically connected to a first end of the resistor R3 and a second end of the capacitor C2 separately; and a second end of the resistor R3 is electrically connected to a reverse-phase input end of the operational amplifier U2 and a first end of the capacitor C3 separately, a first end of the resistor R4 is grounded, a second end of the resistor R4 is electrically connected to an in-phase input end of the operational amplifier U2, and an output end of the operational amplifier U2 is connected to a second end of the capacitor C3.

With reference to the first implementation manner of the first aspect, in a second implementation manner of the first aspect, the mobile terminal further includes a phase-shift circuit configured to shift forward or shift backward a phase of the determined vibration waveform; the phase-shift circuit includes a resistor R5 and a capacitor C4; the output end of the operational amplifier U1 is electrically connected to the first end of the resistor R3 by using the resistor R5; and a first end of the resistor R5 is electrically connected to the output end of the operational amplifier U1 and the second end of the capacitor C2 separately; a second end of the resistor R5 is electrically connected to the first end of the resistor R3, a first end of the capacitor C4 is grounded, and a second end of the capacitor C4 is connected between the resistor R5 and the resistor R3.

With reference to the second implementation manner of the first aspect, in a third implementation manner of the first aspect, the coupling circuit includes a capacitor C5, where: a first end of the capacitor C5 is electrically connected to the output end of the operational amplifier U2 and the second end of the capacitor C3 separately, and a second end of the capacitor C5 is connected to the audio output device.

According to a second aspect, the present disclosure provides a noise reduction apparatus, applicable to a mobile terminal, which is provided with an audio output device and a sensor, the audio output device configured to output audio, where the apparatus includes: an obtaining module, configured to, when the audio output device is in a working state, obtain an acceleration signal of the mobile terminal, where the acceleration signal of the mobile terminal is collected by the sensor; a determining module, configured to determine, according to the acceleration signal, a vibration waveform of the mobile terminal when the mobile terminal vibrates; an inversion module, configured to invert the determined vibration waveform to obtain a noise reduction signal having a waveform the same as the inverted vibration waveform; and a superimposing module, configured to superimpose the noise reduction signal onto to-be-output audio of the audio output device.

With reference to the second aspect, in a first implementation manner of the second aspect, the determining module includes: a first calculation unit, configured to calculate a rate signal according to the acceleration signal; and a second calculation unit, configured to calculate a shift signal according to the rate signal to obtain a vibration waveform of the mobile terminal when the mobile terminal vibrates.

With reference to the second aspect, in a second implementation manner of the second aspect, the inversion module is further configured to: shift forward or shift backward a phase of the determined vibration waveform.

With reference to the first implementation manner or the second implementation manner of the second aspect, in a third implementation manner of the second aspect, the determining module is configured to: adjust the acceleration signal to make an amplitude of the adjusted acceleration signal fall within a predetermined amplitude range; and determine, according to the adjusted acceleration signal, a vibration waveform of the mobile terminal when the mobile terminal vibrates.

According to a third aspect, the present disclosure provides a mobile terminal, the mobile terminal comprising a processor, a memory, an audio output device, and a sensor, wherein: the sensor is configured to collect an acceleration signal of the mobile terminal; the audio output device is configured to output audio; and the processor is configured to execute the following instructions: when the audio output device is in a working state, obtaining the acceleration signal of the mobile terminal that is collected by the sensor; determining, according to the acceleration signal, a vibration waveform of the mobile terminal when the mobile terminal vibrates; inverting the determined vibration waveform to obtain a noise reduction signal having a waveform the same as the inverted vibration waveform; and superimposing the noise reduction signal onto to-be-output audio of the audio output device.

With reference to the third aspect, in a first implementation manner of the third aspect, the processor is configured to: calculate a rate signal according to the acceleration signal; and calculate a shift signal according to the rate signal to obtain a vibration waveform of the mobile terminal when the mobile terminal vibrates.

With reference to the third aspect, in a second implementation manner of the third aspect, the processor is configured to: shift forward or shift backward a phase of the determined vibration waveform.

With reference to the first implementation manner or the second implementation manner of the third aspect, in a third implementation manner of the third aspect, the processor is configured to: adjust the acceleration signal to make an amplitude of the adjusted acceleration signal fall within a predetermined amplitude range; and determine, according to the adjusted acceleration signal, a vibration waveform of the mobile terminal when the mobile terminal vibrates.

According to a fourth aspect, the present disclosure provides a noise reduction method, applicable to a mobile terminal, which is provided with an audio output device configured to output audio, where the method includes: when the audio output device is in a working state, collecting an acceleration signal of the mobile terminal; determining, according to the acceleration signal, a vibration waveform of the mobile terminal when the mobile terminal vibrates; inverting the determined vibration waveform to obtain a noise reduction signal having a waveform the same as the inverted vibration waveform; and superimposing the noise reduction signal onto to-be-output audio of the audio output device.

With reference to the fourth aspect, in a first implementation manner of the fourth aspect, the determining, according to the acceleration signal, a vibration waveform of the mobile terminal when the mobile terminal vibrates includes: calculating a rate signal according to the acceleration signal; and calculating a shift signal according to the rate signal to obtain a vibration waveform of the mobile terminal when the mobile terminal vibrates.

With reference to the fourth aspect, in a second implementation manner of the fourth aspect, before the inverting the determined vibration waveform, the method further includes: shifting forward or shifting backward a phase of the determined vibration waveform.

With reference to the first implementation manner or the second implementation manner of the fourth aspect, in a third implementation manner of the fourth aspect, before the determining, according to the acceleration signal, a vibration waveform of the mobile terminal when the mobile terminal vibrates, the method further includes: adjusting the acceleration signal to make an amplitude of the adjusted acceleration signal fall within a predetermined amplitude range.

Beneficial effects of the technical solutions provided in the embodiments of the present disclosure are: When an audio output device is in a working state, an acceleration signal of the mobile terminal is obtained by using an acceleration sensor; a vibration waveform of the mobile terminal when the mobile terminal vibrates is determined according to the acceleration signal; the vibration waveform may be used to measure a vibration waveform of a human skeleton; the determined vibration waveform is inverted to obtain a noise reduction signal having a waveform the same as the inverted vibration waveform, and the noise reduction signal is superimposed onto to-be-output audio of the audio output device; because the inverted vibration waveform may neutralize the vibration waveform of the human skeleton, noise generated by skeleton vibration is diminished or eliminated, so as to improve an effect of listening, by a person, to audio.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the present disclosure clearer, the following further describes the embodiments of the present disclosure with reference to the accompanying drawings.

To help understand technical solutions provided in embodiments of the present disclosure, noise transmitted in space other than ambient space is first described. When a person is in a vibration environment, such as an automobile or a train, a human skeleton vibrates accordingly. Vibration of the skeleton is directly transmitted to the incus and the stapes and is transmitted to the auditory nerve to form auditory sense. Such auditory sense is inharmonious relative to auditory sense generated by audio output by a mobile terminal and falls within noise that people do not intend to hear. Because a MIC cannot collect noise generated by vibration of the skeleton, an existing noise reduction manner cannot diminish or eliminate noise generated by vibration of the skeleton, and a noise reduction effect is insufficiently desirable.

In addition, in the embodiments of the present disclosure, a mobile terminal includes a smartphone, a notebook computer, and a tablet computer. An audio output device includes a speaker, a receiver, and a headset that are disposed on the mobile terminal.

Figure 1:
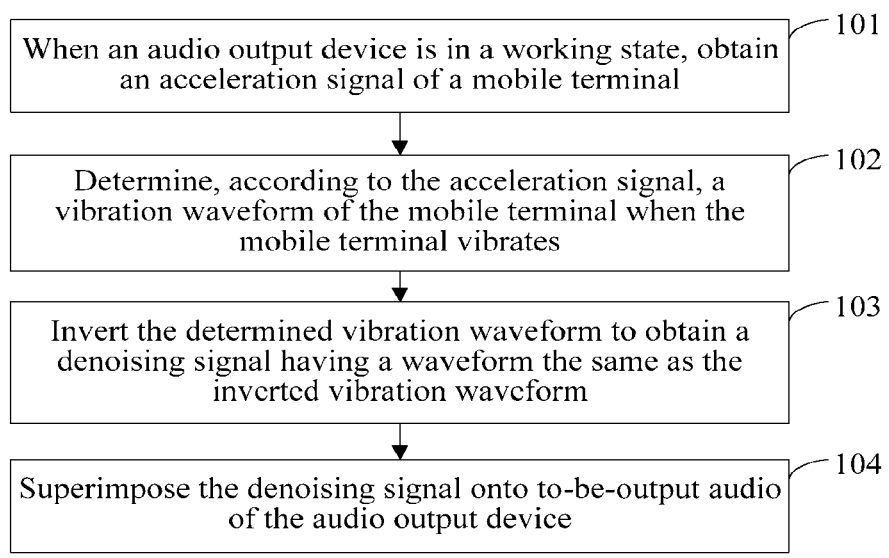
FIG. 1 is a flowchart of a noise reduction method according to an embodiment of the present disclosure.

FIG. 1 shows a noise reduction method according to an embodiment of the present disclosure. This noise reduction method is applicable to a mobile terminal, which is provided with an audio output device configured to output audio. Referring to FIG. 1, a process of this method includes:

Step 101: When the audio output device is in a working state, obtain an acceleration signal of the mobile terminal.

Step 102: Determine, according to the acceleration signal, a vibration waveform of the mobile terminal when the mobile terminal vibrates.

Step 103: Invert the determined vibration waveform to obtain a noise reduction signal having a waveform the same as the inverted vibration waveform.

Step 104: Superimpose the noise reduction signal onto to-be-output audio of the audio output device.

In this embodiment of the present disclosure, when an audio output device is in a working state, an acceleration signal of the mobile terminal is obtained by using an acceleration sensor; a vibration waveform of the mobile terminal when the mobile terminal vibrates is determined according to the acceleration signal; the vibration waveform may be used to measure a vibration waveform of a human skeleton; the determined vibration waveform is inverted to obtain a noise reduction signal having a waveform the same as the inverted vibration waveform, and the noise reduction signal is superimposed onto to-be-output audio of the audio output device; because the inverted vibration waveform may neutralize the vibration waveform of the human skeleton, noise generated by skeleton vibration is diminished or eliminated, so as to improve an effect of listening, by a person, to audio.

The noise reduction method of this embodiment of the present disclosure is implemented in at least two hardware design manners, which are separately described below. A person skilled in the art should understand that the present disclosure is not limited thereto.

Manner 1

A

Figure 2:
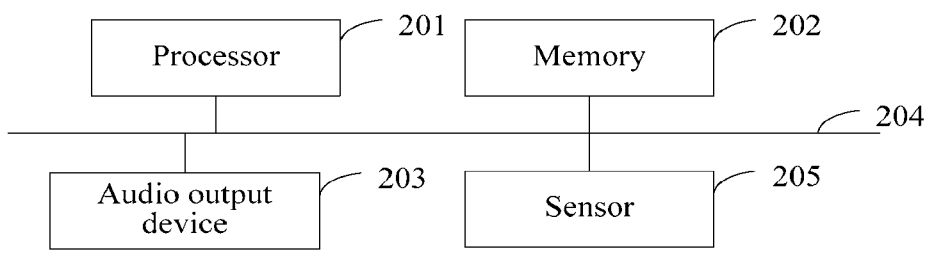
FIG. 2 is a schematic structural diagram of a mobile terminal according to an embodiment of the present disclosure.

FIG. 2 shows a mobile terminal according to an embodiment of the present disclosure. Referring to FIG. 2, the mobile terminal includes at least one processor 201 (for example, a CPU), a memory 202, an audio output device 203, at least one communications bus 204, and at least one sensor 205. A person skilled in the art should understand that a structure of the mobile terminal shown in FIG. 2 does not limit the mobile terminal, and the mobile terminal may include more components or fewer components than those shown in FIG. 2, or some components may be combined, or a different component deployment may be used.

The processor 201, the memory 202, the audio output device 203, the sensor 205, and the communications bus 204.

The communications bus 204 is configured to implement connections and communication among the processor 201, the memory 202, the audio output device 203, and the sensor 205.

The sensor 205 is configured to detect a movement state of the mobile terminal, for example, collect an acceleration of the mobile terminal. The sensor 205 includes an acceleration sensor.

The memory 202 may be configured to store a software program and an application module, and the processor 201 executes various functional applications and data processing of the mobile terminal by running the software program and application module stored in the memory 202. The memory 202 may mainly include a program storage area and a data storage area, where the program storage area may store an operating system, an application program required by at least one function (for example, determining a vibration waveform), and the like; and the data storage area may store data created according to use of the mobile terminal (for example, storing an acceleration signal) and the like. In addition, the memory 202 may include a high-speed RAM (Random Access Memory, random access memory), and may also include a non-volatile memory (non-volatile memory), for example, at least one magnetic disk storage device, a flash memory device, or another volatile solid-state storage device.

The processor 201 is a control center of the mobile terminal, is connected to all parts of the entire mobile terminal by using various interfaces and lines, and executes various functions of the mobile terminal and processes data by running or executing the software program and/or application module stored in the memory 202 and calling data stored in the memory 202, so as to perform overall monitoring on the mobile terminal.

Implementation of noise reduction on the foregoing mobile terminal is described in detail below based on the method shown in FIG. 1.

Figure 3:
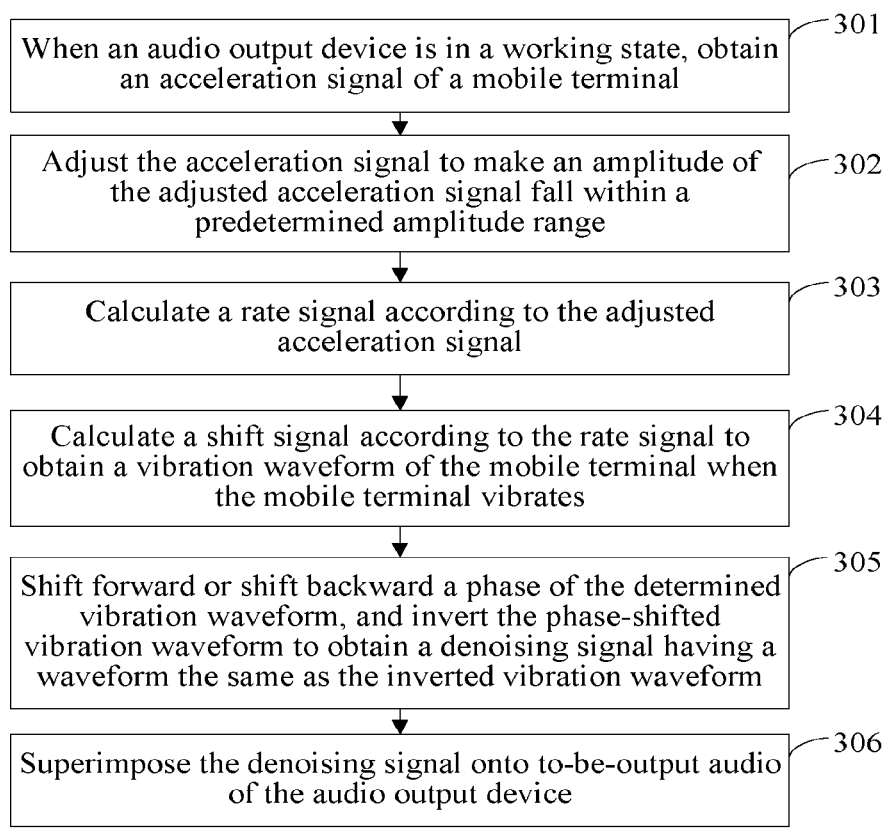
FIG. 3 and FIG. 4 are flowcharts of other noise reduction methods according to embodiments of the present disclosure.

FIG. 3 shows a noise reduction method according to an embodiment of the present disclosure. This noise reduction method is applicable to a mobile terminal, which is provided with an audio output device configured to output audio. Referring to FIG. 3, a process of this method includes:

Step 301: When the audio output device is in a working state, obtain an acceleration signal of the mobile terminal.

In an optional manner of this embodiment, an acceleration of the mobile terminal may be collected by using an acceleration sensor to obtain an acceleration signal. Under the action of an external force, the mobile terminal moves, so as to generate an acceleration. For example, when the mobile terminal is in a vibration environment, such as an automobile or a train, the horizontally placed mobile terminal vibrates and generates an acceleration. Moreover, when the mobile terminal is moved along a straight line, an acceleration can also be generated. Because the acceleration sensor is of three axes, and when the mobile terminal is placed horizontally, an acceleration generated by vibration of the mobile terminal is reflected in a Z-axis direction of the acceleration sensor, an acceleration generated during vibration can be obtained in the following manner: an acceleration sensed by the acceleration sensor in the Z-axis direction is identified, and accelerations sensed in X-axis and Y-axis directions are ignored. Obviously, if the mobile terminal is not subject to an external force, the mobile terminal is relatively stationary, and an acceleration of the mobile terminal is 0.

The acceleration signal may be sampled at a specific frequency, and because a frequency of noise in a vibration environment is generally less than 1 kHz, a sampling frequency of the acceleration signal generally needs to be greater than 2 kHz.

The acceleration sensor, also referred to as an accelerometer, includes a capacitive acceleration sensor. The capacitive acceleration sensor is a pole pitch variable capacitive sensor based on a capacitance principle. Because a manufacturing process of the capacitive acceleration sensor falls within a micro-electro-mechanical system (Micro-Electro-Mechanical System, MEMS for short) process, capacitive acceleration sensors can be massively produced, so as to ensure relatively low costs, thereby enabling the capacitive acceleration sensors to be widely applied to mobile terminals.

In actual application, when the mobile terminal invokes the audio output device to output audio, the acceleration sensor may be invoked at the same time to collect acceleration of the mobile terminal. For example, when the mobile terminal detects that a call function is enabled in a smartphone (implementation of the call function invokes a receiver to play a sound of a peer user having a call with a user), the acceleration sensor is immediately invoked to collect acceleration of the mobile terminal.

The obtained acceleration signal may be an analog signal or a digital signal.

Step 302: Adjust the acceleration signal to make an amplitude of the adjusted acceleration signal fall within a predetermined amplitude range.

When the amplitude of the acceleration signal is less than the predetermined amplitude range, the acceleration signal is amplified, or when the amplitude of the acceleration signal is greater than the predetermined amplitude range, the acceleration signal is diminished. The predetermined amplitude range may be set by a user by using the mobile terminal or may be set in the mobile terminal before delivery.

Strength of suppression on the noise generated by vibration of the skeleton may be adjusted by adjusting the amplitude of the acceleration signal to the predetermined amplitude range. When an amplification multiple of the acceleration signal is larger, the suppression on the noise generated by vibration of the skeleton is stronger, or when the amplification multiple of the acceleration signal is smaller or even the acceleration signal is diminished, the suppression on the noise generated by vibration of the skeleton is weaker.

The acceleration signal may be adjusted by using an amplification circuit. It should be noted that the amplification circuit is applicable to amplification and diminishment of an amplitude of an analog signal. If the acceleration signal that needs to be adjusted is a digital signal, before the acceleration signal is adjusted by using the amplification circuit, the digital acceleration signal may be converted into an analog signal by using a digital-to-analog converter (DAC).

Step 303: Calculate a rate signal according to the adjusted acceleration signal.

The rate signal may be calculated according to formula (1):

$$v(t) = \int a(t)dt = \sum_{i=1}^{N} \left[\frac{a_i + a_{i-1}}{2}\right]\Delta t \quad (1)$$

Step 304: Calculate a shift signal according to the rate signal to obtain a vibration waveform of the mobile terminal when the mobile terminal vibrates.

Because the vibration waveform is a graphical presentation of a shift that changes with time (that is, a shift signal), calculating the shift signal is calculating the vibration waveform. The shift signal may be calculated according to formula (2):

$$s(t) = \int v(t)dt = \sum_{i=1}^{N} \left[\frac{v_i + v_{i-1}}{2}\right]\Delta t \quad (2)$$

where a(t) is an acceleration signal, v(t) is a rate signal, s(t) is a shift signal, $a_i$ is an acceleration value at an $i^{th}$ sampling moment, $v_i$ is a rate value at the $i^{th}$ sampling moment, $a_0=0$, $v_0=0$, $\Delta t$ is a time difference between two adjacent sampling moments, i is 1, 2, . . . , or N, and N is a natural number.

By means of step 302 to step 304, determining, according to the acceleration signal, a vibration waveform of the mobile terminal when the mobile terminal vibrates is implemented. The vibration waveform may be determined by using a processor (referring to the embodiment shown in FIG. 2, FIG. 5, or FIG. 6), and the vibration waveform may also be determined by using a presetting circuit (referring to a circuit shown in FIG. 7). When the vibration waveform is determined by using a processor, the acceleration signal input into the processor is a digital signal, and when the vibration waveform is determined by using a presetting circuit, the acceleration signal input into the presetting circuit is an analog signal.

Step 305: Shift forward or shift backward a phase of the determined vibration waveform, and invert the phase-shifted vibration waveform to obtain a noise reduction signal having a waveform the same as the inverted vibration waveform.

Because a specific deviation may exist between a time of transmitting the vibration to the ear through the skeleton in a vibration environment and a time of outputting the vibration waveform to the human ear, there is a phase difference from the perspective of the waveform. If the phase difference is excessively large, a noise reduction effect is severely affected. Therefore, the phase of the calculated vibration waveform may be shifted forward or shifted backward so as to achieve an effect that a time of outputting the vibration waveform to the human ear is consistent with a time of transmitting the vibration of the skeleton to the human ear. A value of the phase shifted forward or shifted backward may be preset. Personnel may carry out multiple experiments on shifting forward or shifting backward a phase and compare experimental effects with effects generated when no phase shift is performed to determine whether to shift forward or shift backward the phase and determine the value of the phase shifted forward or shifted backward.

It should be noted that in step 305, an inverting operation may also be performed first, and then a phase shifting operation is performed. A sequential order of the inverting and phase shifting operations is not limited in this embodiment.

Step 306: Superimpose the noise reduction signal onto to-be-output audio of the audio output device.

In this embodiment of the present disclosure, when an audio output device is in a working state, an acceleration signal of the mobile terminal is obtained by using an acceleration sensor; a vibration waveform of the mobile terminal when the mobile terminal vibrates is determined according to the acceleration signal; the vibration waveform may be used to measure a vibration waveform of a human skeleton; the determined vibration waveform is inverted to obtain a noise reduction signal having a waveform the same as the inverted vibration waveform, and the noise reduction signal is superimposed onto to-be-output audio of the audio output device; because the inverted vibration waveform may neutralize the vibration waveform of the human skeleton, noise generated by skeleton vibration is diminished or eliminated, so as to improve an effect of listening, by a person, to audio.

Figure 4:
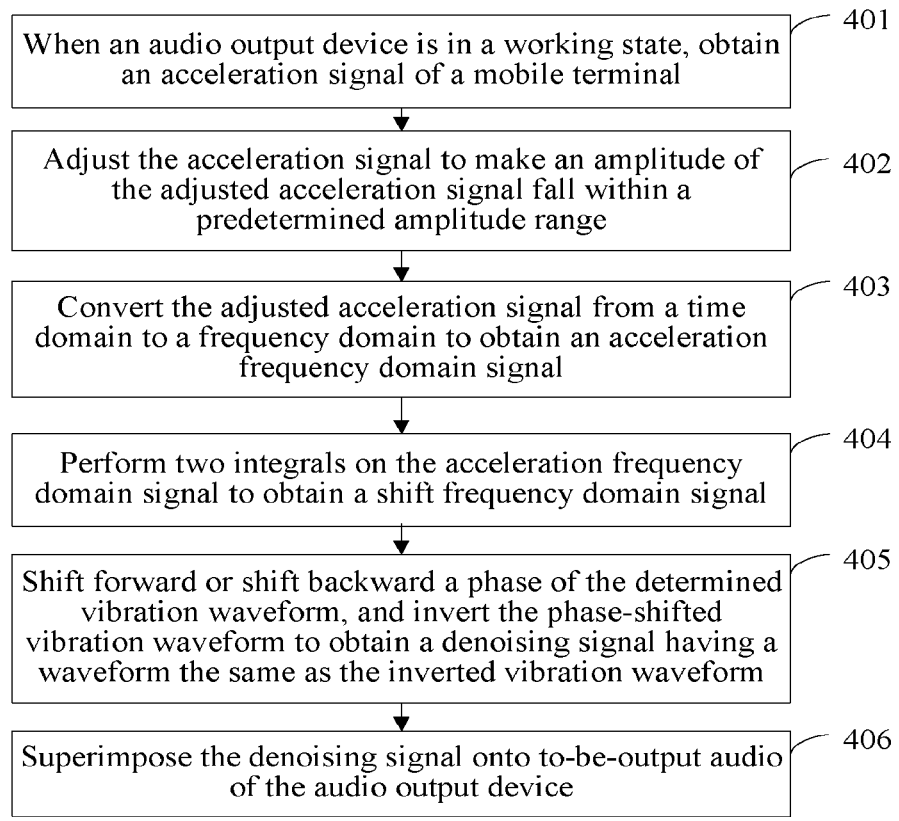

FIG. 4 shows a noise reduction method according to an embodiment of the present disclosure. This noise reduction method is applicable to a mobile terminal, which is provided with an audio output device configured to output audio. Obviously, steps similar to those in FIG. 3 are not described in detail again in this embodiment of the present disclosure. Referring to FIG. 4, a process of this method includes:

Step 401: When the audio output device is in a working state, obtain an acceleration signal of the mobile terminal.

Step 401 is the same as step 301 in the method shown in FIG. 3, and is not described in detail herein again.

Step 402: Adjust the acceleration signal to make an amplitude of the adjusted acceleration signal fall within a predetermined amplitude range.

Step 402 is the same as step 302 in the method shown in FIG. 3, and is not described in detail herein again.

Step 403: Convert the adjusted acceleration signal from a time domain to a frequency domain to obtain an acceleration frequency domain signal.

The acceleration frequency domain signal is represented as follows:

$$a = A_{a_0} \cos(\omega_{a_0} t + \varphi_{a_0}) + A_{a_1} \cos(\omega_{a_1} t + \varphi_{a_1}) + \ldots + A_{a_{N-1}} \cos(\omega_{a_{N-1}} t + \varphi_{a_{N-1}}) \quad (3)$$

where a is an acceleration frequency domain signal, t represents duration starting from a first sampling moment to a current sampling moment, $A_{a_n}$ an is an amplitude value of an acceleration $a_n$ collected at an $n^{th}$ sampling moment, $\omega_{a_n}$ is a circular frequency of the acceleration $a_n$ collected at the $n^{th}$ sampling moment, $\varphi_{a_n}$ is an initial phase angle of the acceleration $a_n$ collected at the $n^{th}$ sampling moment, n is 0, 1, . . . , or N-1 , and N is a natural number.

$$A_{a_n} = \sqrt{a_k^2 + b_k^2},$$

$$\omega_{a_n} = 2\pi \frac{k}{T}, \text{ and } \varphi_{a_n} = \arctan \frac{b_k}{a_k}$$

where T represents a sampling cycle, $(a_k, jb_k)$ is a $k^{th}$ harmonic component in x(k), x(k)=DFT[x(n)]=[$(a_0, jb_0)$, $(a_1, jb_1)$, . . . , $(a_{N-1}, jb_{N-1})$], DFT represents a discrete Fourier transform operation, x(n) represents discrete data constituted by an acceleration collected at each sampling moment, k has a one-to-one correspondence with n, and k is 0, 1, . . . , or N-1.

By means of the discrete Fourier transform operation, a sequence of complex numbers x(k) of x(n) can be obtained. According to x(k), the amplitude value, circular frequency, and initial phase angle of the acceleration at each sampling moment can be calculated. Each acceleration is equivalent to each harmonic component of the acceleration signal, and according to a signal superimposition principle, the acceleration signal may be represented as a sum of harmonic components, as shown in formula (3).

Step 404: Perform two integrals on the acceleration frequency domain signal to obtain a shift frequency domain signal.

The shift frequency domain signal is represented as follows:

$$d = A_{d_0} \cos(\omega_{d_0} t + \varphi_{d_0}) + A_{d_1} \cos(\omega_{d_1} t + \varphi_{d_1}) + \ldots + A_{d_{N-1}} \cos(\omega_{d_{N-1}} t + \varphi_{d_{N-1}})$$

where d represents a shift frequency domain signal, $$A_{d_k} = \frac{A_{a_k}}{\omega_{a_k}^2},$$

$\varphi_{d_k} = \varphi_{a_k} - \pi$, and $\omega_{d_n} = \omega_{a_n}$.

An integral is performed on the acceleration frequency domain signal to obtain a rate frequency domain signal, and an integral is further performed on the rate frequency domain signal to obtain a shift frequency domain signal.

By means of step 402 to step 404, determining, according to the acceleration signal, a vibration waveform of the mobile terminal when the mobile terminal vibrates is implemented.

Step 405: Shift forward or shift backward a phase of the determined vibration waveform, and invert the phase-shifted vibration waveform to obtain a noise reduction signal having a waveform the same as the inverted vibration waveform.

Step 405 is the same as step 305 in the method shown in FIG. 3, and is not described in detail herein again.

Step 406: Superimpose the noise reduction signal onto to-be-output audio of the audio output device.

Step 406 is the same as step 306 in the method shown in FIG. 3, and is not described in detail herein again.

In this embodiment of the present disclosure, when an audio output device is in a working state, an acceleration signal of the mobile terminal is obtained by using an acceleration sensor; a vibration waveform of the mobile terminal when the mobile terminal vibrates is determined according to the acceleration signal; the vibration waveform may be used to measure a vibration waveform of a human skeleton; the determined vibration waveform is inverted to obtain a noise reduction signal having a waveform the same as the inverted vibration waveform, and the noise reduction signal is superimposed onto to-be-output audio of the audio output device; because the inverted vibration waveform may neutralize the vibration waveform of the human skeleton, noise generated by skeleton vibration is diminished or eliminated, so as to improve an effect of listening, by a person, to audio.

Specifically, in this embodiment of the present disclosure, by running or executing a software program and/or an application module stored in the memory 202 and calling data stored in the memory 202, the processor 201 may implement: when the audio output device 203 is in a working state, invoking the sensor 205 to collect an acceleration signal of the mobile terminal; obtaining the acceleration signal of the mobile terminal; determining, according to the acceleration signal, a vibration waveform of the mobile terminal when the mobile terminal vibrates; inverting the calculated vibration waveform to obtain a noise reduction signal having a waveform the same as the inverted vibration waveform; and superimposing the noise reduction signal onto to-be-output audio of the audio output device 203.

In a first implementation manner of this embodiment, the processor 201 may implement calculating a rate signal according to the acceleration signal; and calculating a shift signal according to the rate signal.

In a second implementation manner of this embodiment, the processor 201 may implement shifting forward or shifting backward a phase of the determined vibration waveform.

In a third implementation manner of this embodiment, the processor 201 may implement adjusting the acceleration signal to make an amplitude of the adjusted acceleration signal fall within a predetermined amplitude range.

B

Figure 5:
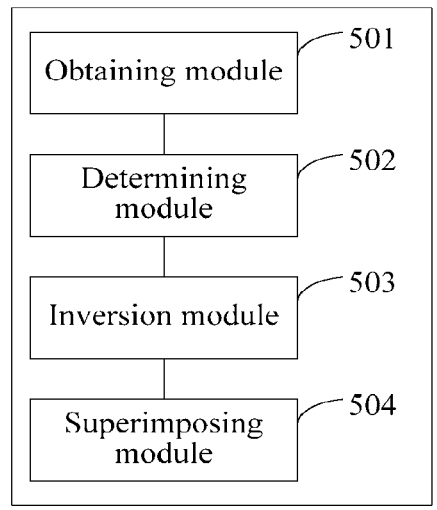
FIG. 5 is a schematic structural diagram of a noise reduction apparatus according to an embodiment of the present disclosure.

FIG. 5 shows a noise reduction apparatus according to an embodiment of the present disclosure, where the apparatus may be disposed on a mobile terminal, and the mobile terminal is provided with an audio output device configured to output audio and a sensor. Referring to FIG. 5, the apparatus includes an obtaining module 501, a determining module 502, an inversion module 503, and a superimposing module 504.

The obtaining module 501 is configured to: when the audio output device is in a working state, obtain an acceleration signal of the mobile terminal, where the acceleration signal of the mobile terminal is collected by the sensor.

The determining module 502 is configured to determine, according to the acceleration signal, a vibration waveform of the mobile terminal when the mobile terminal vibrates.

The inversion module 503 is configured to invert the determined vibration waveform to obtain a noise reduction signal having a waveform the same as the inverted vibration waveform.

The superimposing module 504 is configured to superimpose the noise reduction signal onto to-be-output audio of the audio output device.

In this embodiment of the present disclosure, when an audio output device is in a working state, an acceleration signal of the mobile terminal is obtained by using an acceleration sensor; a vibration waveform of the mobile terminal when the mobile terminal vibrates is determined according to the acceleration signal; the vibration waveform may be used to measure a vibration waveform of a human skeleton; the determined vibration waveform is inverted to obtain a noise reduction signal having a waveform the same as the inverted vibration waveform, and the noise reduction signal is superimposed onto to-be-output audio of the audio output device; because the inverted vibration waveform may neutralize the vibration waveform of the human skeleton, noise generated by skeleton vibration is diminished or eliminated, so as to improve an effect of listening, by a person, to audio.

Figure 6:
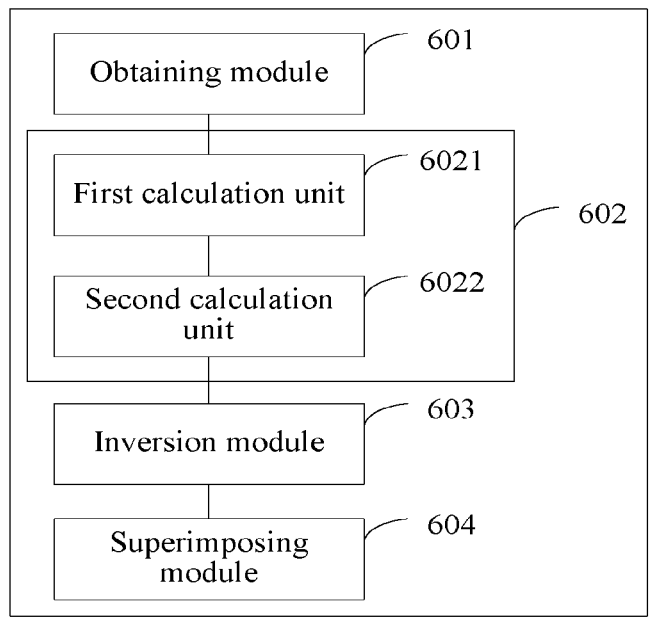
FIG. 6 is a schematic structural diagram of another noise reduction apparatus according to an embodiment of the present disclosure.

FIG. 6 shows a noise reduction apparatus according to an embodiment of the present disclosure, where the apparatus is disposed on a mobile terminal, and the mobile terminal is provided with an audio output device configured to output audio and a sensor. Referring to FIG. 6, the apparatus includes an obtaining module 601, a determining module 602, an inversion module 603, and a superimposing module 604.

The obtaining module 601 is configured to: when the audio output device is in a working state, obtain an acceleration signal of the mobile terminal, where the acceleration signal of the mobile terminal is collected by the sensor.

The determining module 602 is configured to determine, according to the acceleration signal, a vibration waveform of the mobile terminal when the mobile terminal vibrates.

The inversion module 603 is configured to invert the determined vibration waveform to obtain a noise reduction signal having a waveform the same as the inverted vibration waveform.

In a first implementation manner of this embodiment, the determining module 602 includes a first calculation unit 6021 and a second calculation unit 6022.

The first calculation unit 6021 is configured to calculate a rate signal according to the acceleration signal. The first calculation unit 6021 may calculate the rate signal according to formula (4):

$$v(t) = \int a(t)dt = \sum_{i=1}^{N} \left[\frac{a_i + a_{i-1}}{2}\right]\Delta t \quad (4)$$

The second calculation unit 6022 is configured to calculate a shift signal according to the rate signal. The second calculation unit 6022 may calculate the shift signal according to formula (5):

$$s(t) = \int v(t)dt = \sum_{i=1}^{N} \left[\frac{v_i + v_{i-1}}{2}\right]\Delta t \quad (5)$$

where a(t) is an acceleration signal, v(t) is a rate signal, s(t) is a shift signal, $a_i$ is an acceleration value at an $i^{th}$ sampling moment, $v_i$ is a rate value at the ith sampling moment, $a_0=0$, $v_0=0$, $\Delta t$ is a time difference between two adjacent sampling moments, i is 1, 2, ..., or N, and N is a natural number.

In a second implementation manner of this embodiment, the determining module 602 is configured to convert the acceleration signal from a time domain to a frequency domain to obtain an acceleration frequency domain signal; and perform two integrals on the acceleration frequency domain signal to obtain a shift frequency domain signal.

The acceleration frequency domain signal is $a = A_{a_0} \cos(\omega_{a_0}t + \varphi_{a_0}) + A_{a_1} \cos(\omega_{a_1}t + \varphi_{a_1}) + \ldots + A_{a_{N-1}} \cos(\omega_{a_{N-1}}t + \varphi_{a_{N-1}})$, where a is an acceleration frequency domain signal, t represents duration starting from a first sampling moment to a current sampling moment, $A_{a_n}$ is an amplitude value of an acceleration $a_n$ collected at an $n^{th}$ sampling moment, $\omega_{a_n}$ is a circular frequency of the acceleration $a_n$ collected at the $n^{th}$ sampling moment, $\varphi_{a_n}$ is an initial phase angle of the acceleration $a_n$ collected at the $n^{th}$ sampling moment, n is 0, 1, ..., or N-1, and N is a natural number.

$$A_{a_n} = \sqrt{a_k^2 + b_k^2},$$

$$\omega_{a_n} = 2\pi\frac{k}{T}, \text{ and } \varphi_{a_n} = \arctan\frac{b_k}{a_k}$$

where T represents a sampling cycle, (ak, jbk) is a $k^{th}$ harmonic component in x(k), x(k)=DFT[x(n)]=[(a0, jb0), (a1, jb1), ..., (aN-1, jbN-1)], DFT represents a discrete Fourier transform operation, x(n) represents discrete data constituted by an acceleration collected at each sampling moment, k has a one-to-one correspondence with n, and k is 0, 1, . . . , or N-1.

The shift frequency domain signal is $d = A_{d_0} \cos(\omega_{d_0} t + \varphi_{d_0}) + A_{d_1} \cos(\omega_{d_1} t + \varphi_{d_1}) + \ldots + A_{d_{N-1}} \cos(\omega_{d_{N-1}} t + \varphi_{d_{N-1}})$, where d represents a shift frequency domain signal.

$$A_{d_k} = \frac{A_{a_k}}{\omega_{a_k}^2},$$

$\varphi_{d_k} = \varphi_{a_k} - \pi$, and $\omega_{d_n} = \omega_{a_n}$.

In a third implementation manner of this embodiment, the determining module 602 is configured to adjust the acceleration signal to make an amplitude of the adjusted acceleration signal fall within a predetermined amplitude range; and determine, according to the adjusted acceleration signal, a vibration waveform of the mobile terminal when the mobile terminal vibrates.

In a fourth implementation manner of this embodiment, the inversion module 603 is further configured to shift forward or shift backward a phase of the determined vibration waveform.

The superimposing module 604 is configured to superimpose the noise reduction signal onto to-be-output audio of the audio output device.

In this embodiment of the present disclosure, when an audio output device is in a working state, an acceleration signal of the mobile terminal is obtained by using an acceleration sensor; a vibration waveform of the mobile terminal when the mobile terminal vibrates is determined according to the acceleration signal; the vibration waveform may be used to measure a vibration waveform of a human skeleton; the determined vibration waveform is inverted to obtain a noise reduction signal having a waveform the same as the inverted vibration waveform, and the noise reduction signal is superimposed onto to-be-output audio of the audio output device; because the inverted vibration waveform may neutralize the vibration waveform of the human skeleton, noise generated by skeleton vibration is diminished or eliminated, so as to improve an effect of listening, by a person, to audio.

Manner 2

Figure 7:
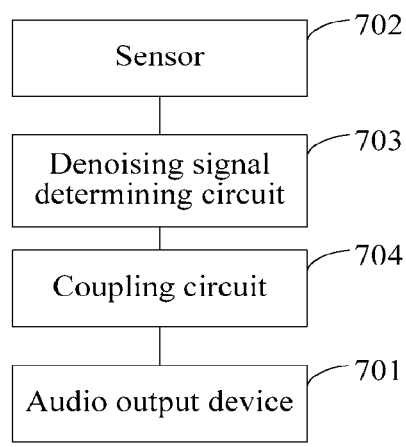
FIG. 7 is a schematic structural diagram of another mobile terminal according to an embodiment of the present disclosure.

FIG. 7 shows a mobile terminal according to an embodiment of the present disclosure, applicable to the noise reduction methods shown in FIG. 1, FIG. 3, and FIG. 4. Referring to FIG. 7, the mobile terminal includes an audio output device 701 configured to output audio and a sensor 702 configured to collect an acceleration signal of the mobile terminal. The mobile terminal further includes a noise reduction signal determining circuit 703 and a coupling circuit 704.

The noise reduction signal determining circuit 703 is configured to: when the audio output device 701 is in a working state, obtain the acceleration signal of the mobile terminal, determine, according to the acceleration signal, a vibration waveform of the mobile terminal when the mobile terminal vibrates, and further invert the determined vibration waveform to obtain a noise reduction signal having a waveform the same as the inverted vibration waveform.

Figure 8:
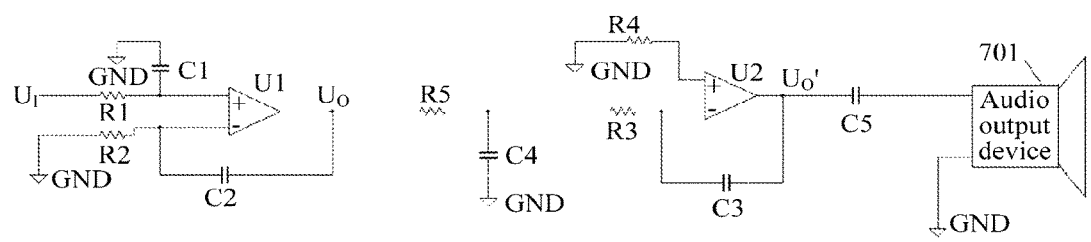
FIG. 8 is a schematic structural diagram of a noise reduction signal determining circuit and a coupling circuit according to an embodiment of the present disclosure.

In a first implementation manner of this embodiment, referring to FIG. 8, the noise reduction signal determining circuit 703 includes a resistor R1, a resistor R2, a resistor R3, a resistor R4, a capacitor C1, a capacitor C2, a capacitor C3, an operational amplifier U1, and an operational amplifier U2.

A first end of the resistor R1 receives the acceleration signal, a second end of the resistor R1 is electrically connected to an in-phase input end of the operational amplifier U1 and a first end of the capacitor C1 separately, and a second end of the capacitor C1 is grounded.

A first end of the resistor R2 is grounded, a second end of the resistor R2 is electrically connected to a reverse-phase input end of the operational amplifier U1 and a first end of the capacitor C2 separately, and an output end of the operational amplifier U1 is electrically connected to a first end of the resistor R3 and a second end of the capacitor C2 separately.

A second end of the resistor R3 is electrically connected to a reverse-phase input end of the operational amplifier U2 and a first end of the capacitor C3 separately, a first end of the resistor R4 is grounded, a second end of the resistor R4 is electrically connected to an in-phase input end of the operational amplifier U2, and an output end of the operational amplifier U2 is connected to a second end of the capacitor C3.

A working principle of the noise reduction signal determining circuit 703 is briefly described. The resistor R1, the resistor R2, the capacitor C1, the capacitor C2, and the operational amplifier U1 constitute an in-phase integrator circuit. The in-phase integrator circuit mainly has an in-phase integral function. Assuming that resistance values of the resistor R1 and the resistor R2 are both R, capacitance values of the capacitor C1 and the capacitor C2 are both C, an input signal of the first end of the resistor R1 is $U_I$, and an output signal of the in-phase integrator circuit is $U_O$, the output signal $U_O$ is shown in formula (6):

$$u_O = \frac{1}{RC} \int u_I dt \qquad (6)$$

It can be seen from formula (6) that the in-phase integrator circuit further has functions of amplifying and diminishing the output signal.

The resistor R3, the resistor R4, the capacitor C3, and the operational amplifier U1 constitute an reverse-phase integrator circuit. The reverse-phase integrator circuit mainly has functions of performing a secondary integral and inverting a waveform. An input signal of the first end of the resistor R3 is $U_O$. Assuming that resistance values of the resistor R3 and the resistor R4 are both R', a capacitance value of the capacitor C3 is C', and an output signal of the reverse-phase integrator circuit is $U_O'$, the output signal $U_O'$ is shown in formula (7):

$$u_O' = -\frac{1}{R'C'} \int u_O dt \qquad (7)$$

In a second implementation manner of this embodiment, referring to FIG. 8, the mobile terminal further includes a phase-shift circuit configured to shift forward or shift backward a phase of the determined vibration waveform, and the phase-shift circuit includes a resistor R5 and a capacitor C4.

The output end of the operational amplifier U1 is electrically connected to the first end of the resistor R3 by using the resistor R5.

A first end of the resistor R5 is electrically connected to the output end of the operational amplifier U1 and the second end of the capacitor C2 separately; a second end of the resistor R5 is electrically connected to the first end of the resistor R3, a first end of the capacitor C4 is grounded, and a second end of the capacitor C4 is connected between the resistor R5 and the resistor R3.

Figure 9:
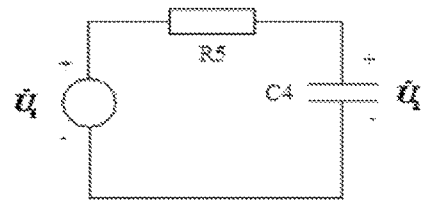
FIG. 9 is a schematic principle diagram of a phase-shift circuit according to an embodiment of the present disclosure.

The phase-shift circuit constituted by the resistor R5 and the capacitor C4 may be simplified as a circuit shown in FIG. 9. Assuming that an input sinusoidal signal voltage of the circuit is $U_1=U_1\angle 0°$ V, a resistance value of the resistor R5 is $R_1$, and a capacitance value of the capacitor C4 is $C_1$, a response voltage $U_2$ is shown in formula (8), where $\omega$ is an angular frequency of the input signal $U_1$, and c is a capacitance of the capacitor C4.

$$\dot{U}_2 = \frac{\frac{1}{j\omega c}}{R_1 + \frac{1}{j\omega c}} U_1 = \frac{U_1}{\sqrt{1+(\omega R_1 c)^2}} \angle -\arctan(\omega R_1 C_1) \quad (8)$$

where an effective value $U_2$ of the response voltage $U_2$ is shown in formula (9):

$$U_2 = \frac{U_1}{\sqrt{1+(\omega RC)^2}} \quad (9)$$

A phase $\varphi_2$ of the response voltage $U_2$ is: $\varphi_2 = \angle -\arctan \omega RC$. It can be seen from formula (8) and formula (9) that the magnitude and the phase of the response voltage change as a circuit parameter changes when the angular frequency of the input signal is unchanged. If a capacitance value of the capacitor C4 is unchanged, and a resistance value of the resistor R5 changes from zero to infinity, the phase of the response voltage changes from 0° to −90°.

The coupling circuit 704 is configured to superimpose the noise reduction signal onto to-be-output audio of the audio output device.

In a third implementation manner of this embodiment, referring to FIG. 8, the coupling circuit 704 includes a capacitor C5, where a first end of the capacitor C5 is electrically connected to the output end of the operational amplifier U2 and the second end of the capacitor C3 separately, and a second end of the capacitor C5 is connected to the audio output device 701.

Alternating-current signals may be coupled by using the capacitor C5.

In this embodiment of the present disclosure, when an audio output device is in a working state, an acceleration signal of the mobile terminal is obtained by using an acceleration sensor; a vibration waveform of the mobile terminal when the mobile terminal vibrates is determined according to the acceleration signal; the vibration waveform may be used to measure a vibration waveform of a human skeleton; the determined vibration waveform is inverted to obtain a noise reduction signal having a waveform the same as the inverted vibration waveform, and the noise reduction signal is superimposed onto to-be-output audio of the audio output device; because the inverted vibration waveform may neutralize the vibration waveform of the human skeleton, noise generated by skeleton vibration is diminished or eliminated, so as to improve an effect of listening, by a person, to audio.

It should be noted that when the noise reduction apparatus provided in the foregoing embodiments performs noise reduction, division of the foregoing functional modules is used as an example for illustration. In actual application, the foregoing functions can be allocated to different functional modules and implemented according to a requirement, that is, an internal structure of a device is divided into different functional modules to implement all or some of the functions described above. In addition, the noise reduction apparatus provided in the foregoing embodiments and the embodiments of the noise reduction method belong to the same concept, and reference may be made to the method embodiments for a specific implementation process thereof, which is not described herein again.

The sequence numbers of the foregoing embodiments of the present disclosure are merely for illustrative purposes, and are not intended to indicate priorities of the embodiments.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely exemplary embodiments of the present disclosure, but are not intended to limit the present disclosure. Any modification, equivalent replacement, and improvement made without departing from the spirit and principle of the present disclosure shall fall within the protection scope of the present disclosure.

What is claimed is:

1. A mobile terminal comprising:
   a processor;
   an audio output device configured to output audio;
   a sensor configured to generate an acceleration signal of the mobile terminal;
   a noise reduction signal determining circuit configured to:
      obtain the acceleration signal of the mobile terminal when the audio output device is in a working state,
      integrate the acceleration signal to generate a rate signal,
      calculate a shift signal based on the rate signal to obtain a vibration waveform of the mobile terminal when the mobile terminal vibrates, and
      invert the vibration waveform to obtain a noise reduction signal; and
   a coupling circuit configured to superimpose the noise reduction signal onto to-be-output audio of the audio output device.

2. The mobile terminal according to claim 1, wherein the noise reduction signal determining circuit comprises:
   a first integrator circuit configured to integrate the acceleration signal to generate the rate signal; and
   a second integrator circuit configured to integrate the rate signal to generate the vibration waveform of the mobile terminal.

3. The mobile terminal according to claim 2, wherein the first integrator circuit comprises a resistor R1, a resistor R2, a capacitor C1, a capacitor C2, and an operational amplifier U1,
   wherein a first end of the resistor R1 receives the acceleration signal, a second end of the resistor R1 is electrically connected to an in-phase input end of the operational amplifier U1 and a first end of the capacitor C1 separately, and a second end of the capacitor C1 is grounded, and wherein a first end of the resistor R2 is grounded, a second end of the resistor R2 is electrically connected to a reverse-phase input end of the operational amplifier U1 and a first end of the capacitor C2 separately, and an output end of the operational amplifier U1 outputs the rate signal.

4. The mobile terminal according to claim 3, wherein the second integrator circuit comprises a resistor R3, a resistor R4, a capacitor C3, and an operational amplifier U2,
wherein the output end of the operational amplifier U1 is electrically connected to a first end of the resistor R3 and a second end of the capacitor C2 separately, and
wherein a second end of the resistor R3 is electrically connected to a reverse-phase input end of the operational amplifier U2 and a first end of the capacitor C3 separately, a first end of the resistor R4 is grounded, a second end of the resistor R4 is electrically connected to an in-phase input end of the operational amplifier U2, and an output end of the operational amplifier U2 is connected to a second end of the capacitor C3.

5. The mobile terminal according to claim 2, further comprising:
a phase-shift circuit configured to shift forward or shift backward a phase of the determined vibration waveform.

6. The mobile terminal according to claim 4, further comprising:
a phase-shift circuit configured to shift forward or shift backward the vibration waveform,
wherein the phase-shift circuit comprises a resistor R5 and a capacitor C4,
wherein the output end of the operational amplifier U1 is electrically connected to the first end of the resistor R3 by using the resistor R5, and
wherein a first end of the resistor R5 is electrically connected to the output end of the operational amplifier U1 and the second end of the capacitor C2 separately, a second end of the resistor R5 is electrically connected to the first end of the resistor R3, a first end of the capacitor C4 is grounded, and a second end of the capacitor C4 is connected between the resistor R5 and the resistor R3.

7. The mobile terminal according to claim 6, wherein the coupling circuit comprises a capacitor C5, and
wherein a first end of the capacitor C5 is electrically connected to the output end of the operational amplifier U2 and the second end of the capacitor C3 separately, and a second end of the capacitor C5 is connected to the audio output device.

8. A mobile terminal comprising:
a sensor configured to generate an acceleration signal of the mobile terminal;
an audio output device configured to output audio;
a memory configured to store software instructions; and
a processor configured to execute the software instructions to:
obtain the acceleration signal of the mobile terminal when the audio output device is in a working state;
integrate the acceleration signal to generate a rate signal;
calculate a shift signal based on the rate signal to obtain a vibration waveform of the mobile terminal when the mobile terminal vibrates;
invert the vibration waveform to obtain a noise reduction signal; and
superimpose the noise reduction signal onto to-be-output audio of the audio output device.

9. The mobile terminal according to claim 8, wherein the processor is further configured to:
shift forward or shift backward the determined vibration waveform by a phase.

10. The mobile terminal according to claim 8, wherein the processor is further configured to:
adjust the acceleration signal to make an amplitude of the adjusted acceleration signal fall within a predetermined amplitude range; and
determine, based on the adjusted acceleration signal, the vibration waveform of the mobile terminal when the mobile terminal vibrates.

11. A noise reduction method, applicable to a mobile terminal, which is provided with an audio output device configured to output audio, wherein the method comprises:
generating an acceleration signal of the mobile terminal when the audio output device is in a working state;
integrating the acceleration signal to generate a rate signal;
calculating a shift signal based on the rate signal to obtain a vibration waveform of the mobile terminal when the mobile terminal vibrates;
inverting the vibration waveform to obtain a noise reduction signal; and
superimposing the noise reduction signal onto to-be-output audio of the audio output device.

12. The method according to claim 11, wherein before inverting the determined vibration waveform, the method further comprises:
shifting forward or shifting backward the determined vibration waveform by a phase.

13. The method according to claim 11, wherein before determining the vibration waveform of the mobile terminal when the mobile terminal vibrates, the method further comprises:
adjusting the acceleration signal to make an amplitude of the adjusted acceleration signal fall within a predetermined amplitude range.

* * * * *

UNITED STATES PATENT AND TRADEMARK OFFICE
CERTIFICATE OF CORRECTION

| | | |
|---|---|---|
| PATENT NO. | : 10,089,972 B2 | Page 1 of 1 |
| APPLICATION NO. | : 15/321210 | |
| DATED | : October 2, 2018 | |
| INVENTOR(S) | : Wenlong Zhao | |

It is certified that error appears in the above-identified patent and that said Letters Patent is hereby corrected as shown below:

In the Specification

In Column 2, Line 29, change "resistor RS is electrically connected to the first end" to --resistor R5 is electrically connected to the first end--.

In Column 14, Line 67, change "resistor RS." to --resistor R5.--.

In Column 15, Line 1, change "A first end of the resistor RS is electrically connected to" to --A first end of the resistor R5 is electrically connected to--.

Signed and Sealed this
Twentieth Day of August, 2019

Andrei Iancu
*Director of the United States Patent and Trademark Office*